United States Patent
Elliott

(10) Patent No.: US 6,521,076 B1
(45) Date of Patent: Feb. 18, 2003

(54) METHOD OF MAKING SHINGLES OF TWO DIFFERENT DIMENSIONS USING A COMMON SHINGLE MAT SIZE

(75) Inventor: Bert Whitmore Elliott, Westerville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 104 days.

(21) Appl. No.: 09/607,270

(22) Filed: Jun. 30, 2000

(51) Int. Cl.[7] .............................. B32B 31/00; E04D 5/00
(52) U.S. Cl. ..................... 156/259; 156/264; 156/270; 156/271; 156/512; 156/517; 52/518
(58) Field of Search ................................. 156/259, 264, 156/270, 271, 269, 512, 517; 83/920; 52/518

(56) References Cited

U.S. PATENT DOCUMENTS

| | | | |
|---|---|---|---|
| 3,998,685 A | 12/1976 | Czyzewski et al. | 156/260 |
| 4,198,257 A | 4/1980 | Pfaff | 156/260 |
| 4,233,100 A | 11/1980 | Cunningham et al. | 156/260 |
| 4,499,702 A | * 2/1985 | Turner | 52/555 |
| 4,729,814 A | 3/1988 | Jennus et al. | 156/512 |
| 4,737,904 A | 4/1988 | Ominato | 364/167 |
| 4,775,440 A | 10/1988 | Jennus et al. | 156/260 |
| 4,781,090 A | 11/1988 | Feldkamper et al. | 83/74 |
| 4,869,942 A | 9/1989 | Jennus et al. | 428/77 |
| 5,052,162 A | 10/1991 | Bush et al. | 52/518 |
| 5,062,340 A | 11/1991 | Greven | 83/95 |
| 5,102,487 A | 4/1992 | Lamb | 156/260 |
| 5,209,802 A | 5/1993 | Hannah et al. | 156/250 |
| 5,961,780 A | 10/1999 | Kalkanoglu et al. | 156/517 |
| 6,014,847 A | 1/2000 | Phillips | 52/311.1 |
| 6,038,826 A | 3/2000 | Stahl et al. | 52/554 |
| 6,174,403 B1 | * 1/2001 | Stainer, Jr. et al. | 156/260 |

* cited by examiner

*Primary Examiner*—Linda Gray
(74) *Attorney, Agent, or Firm*—Inger H. Eckert; James J. Dottavio

(57) ABSTRACT

A method of manufacturing laminated roofing shingles comprises coating a continuously supplied shingle mat having a width W with roofing asphalt to make an asphalt coated sheet, and subjecting the asphalt coated sheet to one of two subsequent processes. The first process comprises covering the asphalt coated sheet with granules in a first pattern suitable for making laminated shingles with an overlay having tabs and cutouts, where the area of the tabs approximately equals the area of the cutouts, thereby forming a first granule covered sheet. The second process comprises covering the asphalt coated sheet with granules in a second pattern suitable for making laminated shingles with an overlay having tabs and cutouts, where the area of the tabs is substantially greater than the area of the cutouts, thereby forming a second granule covered sheet.

6 Claims, 5 Drawing Sheets

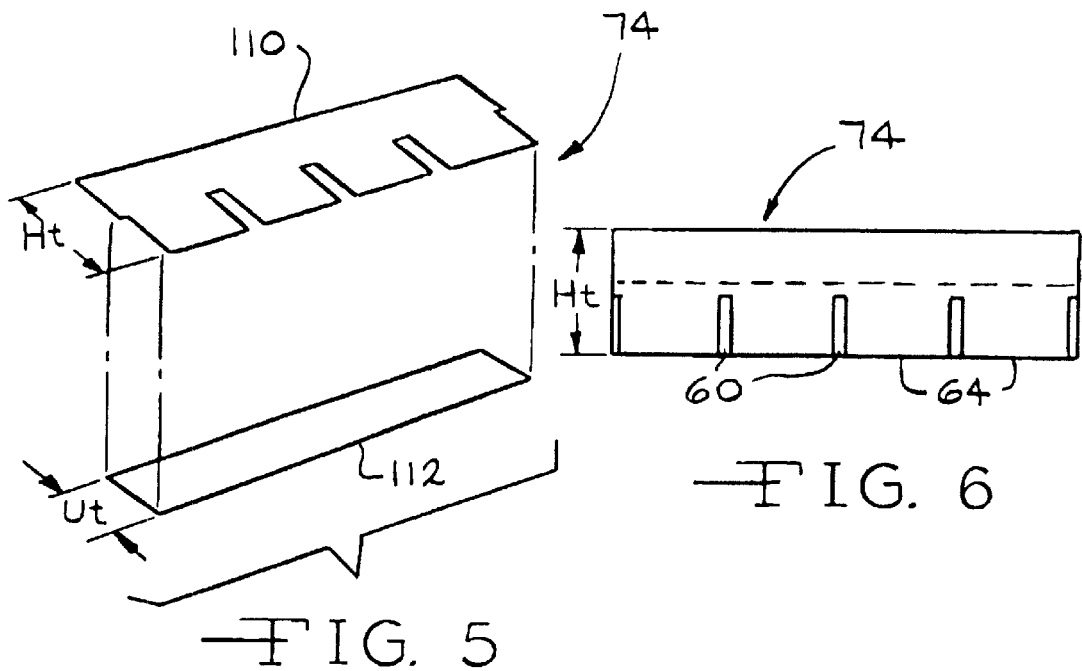
FIG. 5
FIG. 6
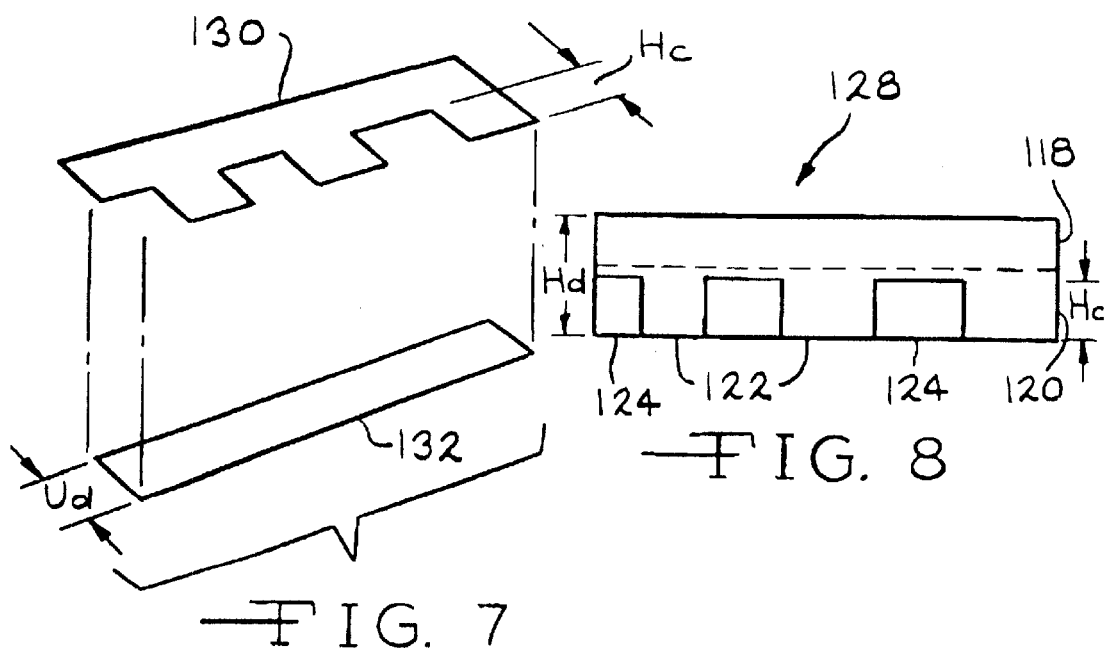
FIG. 7
FIG. 8

METHOD OF MAKING SHINGLES OF TWO DIFFERENT DIMENSIONS USING A COMMON SHINGLE MAT SIZE

CROSS REFERENCE TO RELATED APPLICATIONS

The present invention may be related to the following U.S. patent applications: Ser. No. 09/607,271, entitled TABBED SHINGLES LENGTH CUT AT MID-TAB, filed Jun. 30, 2000; and Ser. No. 09/607,489, entitled SHINGLE SYNCHRONIZATION BETWEEN BLEND DROP AND CUT, AND BETWEEN PATTERN AND PATTERN CUTTER, filed Jun. 30, 2000.

TECHNICAL FIELD

This invention relates in general to manufacturing shingles, and in particular, to manufacturing laminated roofing shingles having underlays and overlays. More particularly, this invention pertains to a method of configuring a shingle manufacturing operation to enable the most efficient use of material and allow the manufacture of shingles of two different dimensions and shingle configurations using a common shingle mat size.

BACKGROUND OF THE INVENTION

In the past, roofing shingles have had to satisfy two main functions when applied to a roof deck. The first function is to provide a durable, weatherproof covering for the roof deck. Roof shingles, whatever their form, are intended to provide a means of sheltering the structure below the shingles from precipitation and the deleterious effects of sun and wind. Roof shingles installed on the roof deck must perform these protecting functions for a reasonable period of time. The second function is to present an aesthetically pleasing architectural feature which enhances the overall appeal of the structure to which the shingles have been applied. This aesthetic function has been satisfied by providing asphalt shingles with various butt edge contours and surface treatments which operate to simulate more traditional, and in most cases more expensive, forms of roof coverings, such as, thatch, wooden shakes, slates, and even tiles of various forms.

Natural slate tiles have long been used as a roof covering. Natural slate is a durable material and is considered to provide an aesthetically pleasing look or appearance to a roof. A problem with natural slate roofs is that the installed cost is extremely high. Therefore, alternatives in the form of asphalt shingles that mimic the look of natural slate have been developed. In the case of asphalt shingles mimicking the look of natural slate, each shingle is typically provided with relatively wide tabs, such as for example, 9 inches wide, separated by relatively narrow cutouts, such as 1 inch wide. Ideally these slate-look shingles are made on a double wide shingle machine so that two shingles can be made simultaneously.

Another aesthetically pleasing shingle is a tab and cutout laminated shingle having a headlap portion and a tab portion including tabs and cutouts. Both the tabs and the cutouts are relatively wide, and the width of the tabs and the cutouts can vary. The area of the tabs is roughly equal to the area of the cutouts so that the two shingles can be simultaneously manufactured by cutting a common tab portion of a continuously moving granule covered sheet. The tabs and cutouts are complementary so that the cutouts and tabs of one side of the common tab portion match the tabs and cutouts, respectively, of the other side of the common tab portion. An example of this is shown in U.S. Pat. No. 5,102,487 to Lamb, which is hereby incorporated by reference in its entirety. Improvements in the design of these wide tab, wide cutout shingles include contrasting coloration between the tabbed overlay and the portions of the underlay that show through the cutouts, and the use of shadow lines to enhance the perception of depth or thickness of the shingle.

In order to produce shingles of both the slate-look type and the wide tab, wide cutout type at the same shingle manufacturing facility it is necessary to change the supply of shingle mat because invariably the width of the shingle mat needed for one type of shingle is different from the width of the shingle mat needed for another type of shingle. The necessity of changing the supply of shingle mat to switch from one type of shingle to the other increases the manufacturing cost for both types of shingles, both because of the expense and machine downtime during the changeover, and because of the need for greater storage of one or the other type of shingle. It would be advantageous if there could be developed a shingle manufacturing operation that better accommodated the need for making different types of shingle on a single shingle machine.

SUMMARY OF THE INVENTION

The above objects as well as other objects not specifically enumerated are achieved by a method of manufacturing laminated roofing shingles comprising coating a continuously supplied shingle mat having a width W with roofing asphalt to make an asphalt coated sheet, and subjecting the asphalt coated sheet to one of two subsequent processes. The first process comprises covering the asphalt coated sheet with granules in a first pattern suitable for making laminated shingles with an overlay having tabs and cutouts, where the area of the tabs approximately equals the area of the cutouts, thereby forming a first granule covered sheet. The first process also includes continuously dividing the first granule covered sheet into two continuous first overlay sheets and two continuous first underlay sheets, wherein the two first overlay sheets each have a headlap portion and the two first overlay sheets share a common tab portion having tabs and cutouts that are complementary so that the cutouts and tabs of one of the first overlay sheets are in registration with the tabs and cutouts, respectively, of the other one of the first overlay sheets, and wherein the sum of the height of each of the two continuous first underlay sheets plus the height of each of the headlap portions of the two first overlay sheets plus the height of the common tab portion substantially equals the width W of the shingle mat. The first process also includes laminating each one of the first underlay sheets beneath a respective one of the first overlay sheets to form laminated sheets, and cutting the laminated sheets into laminated shingles.

The second process comprises covering the asphalt coated sheet with granules in a second pattern suitable for making laminated shingles with an overlay having tabs and cutouts, where the area of the tabs is substantially greater than the area of the cutouts, thereby forming a second granule covered sheet. The second process also includes continuously dividing the second granule covered sheet into two continuous second underlay sheets and into two continuous second overlay sheets, wherein the two second overlay sheets each have a headlap portion and a tab portion, and wherein the sum of the height of each of the two continuous second underlay sheets plus the height of the headlap portion and tab portion of each of the two second overlay sheets substantially equals the width W of the shingle mat. The second process further includes laminating each one of the second underlay sheets beneath a respective one of the second overlay sheets to form laminated sheets, and cutting the laminated sheets into laminated shingles.

The invention includes switching from one of the first and second processes to the other process to make shingles according to either the first pattern or the second pattern using a common shingle mat having the width W.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is an exploded view of a slate look shingle made according to the process illustrated in FIG. 3.

FIG. 6 is a plan view of the shingle of FIG. 5.

FIG. 7 is an exploded view of a wide tab and wide cutout shingle made according to the process illustrated in FIG. 4.

FIG. 8 is a plan view of the shingle of FIG. 7.

DETAILED DESCRIPTION OF THE INVENTION

Figure 1:
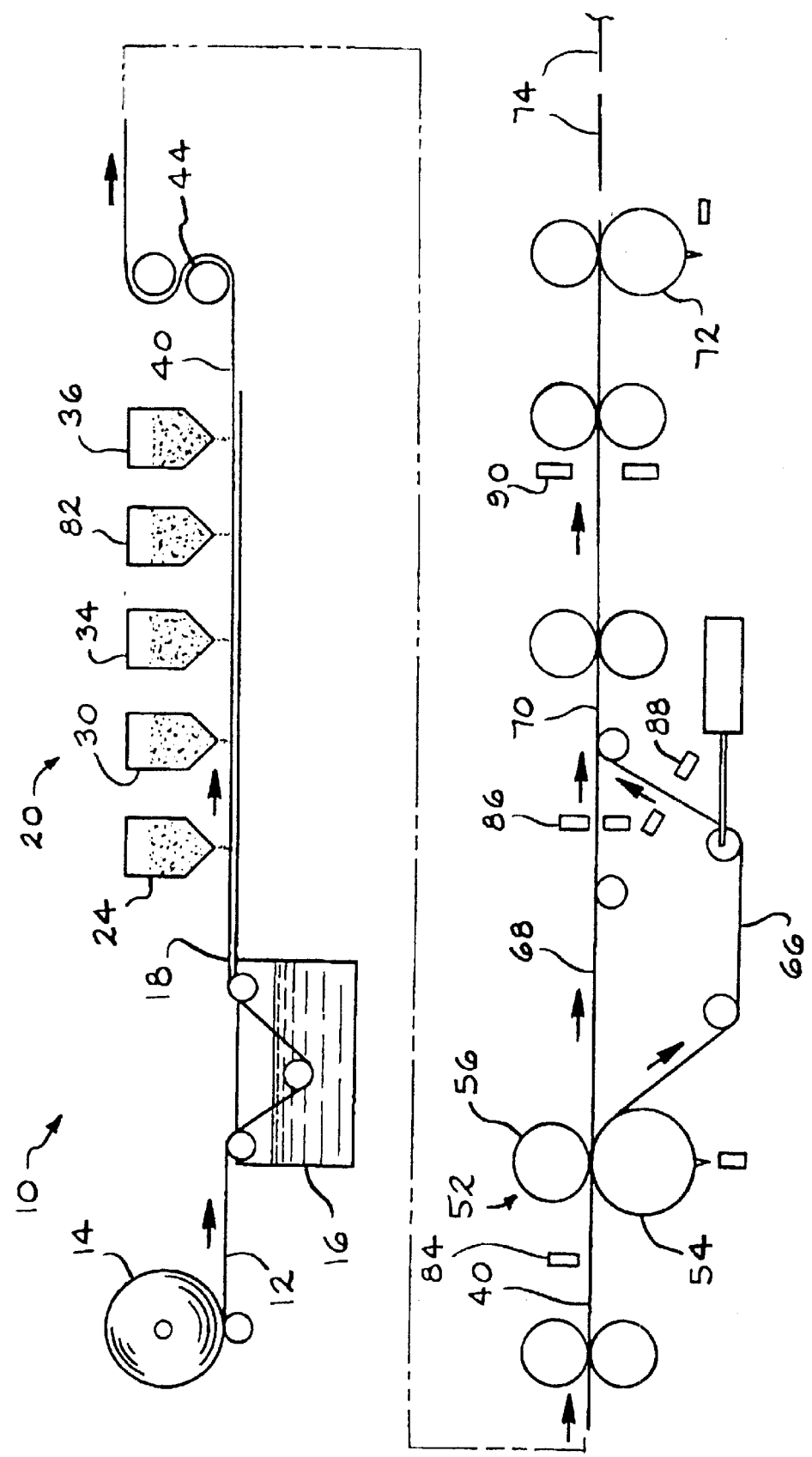
FIG. 1 is a schematic elevational view of an apparatus for making shingles according to the invention.
Figure 2:
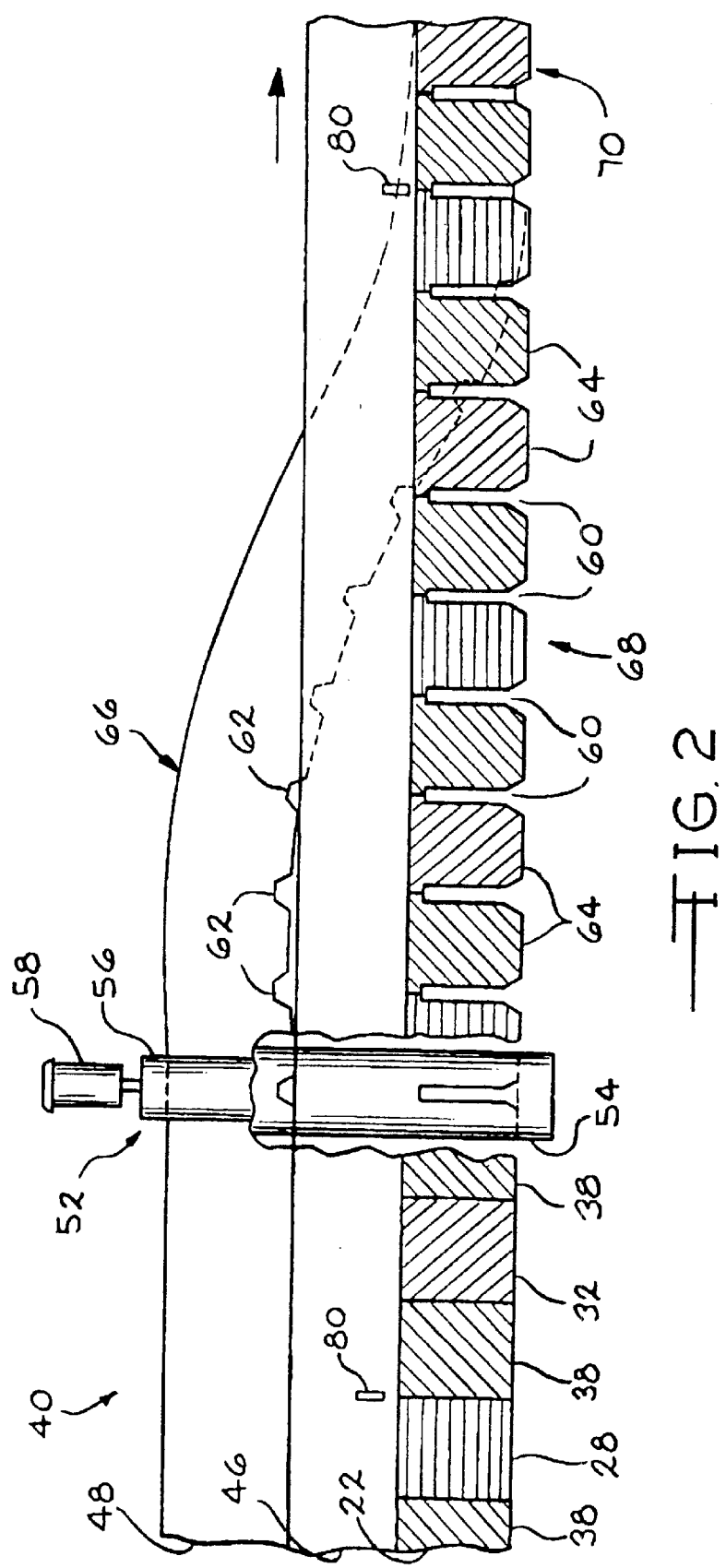
FIG. 2 is a plan view of a portion of the apparatus of FIG. 1, showing the laminating of the shingle underlay beneath the overlay to make a single laminated strip.

Referring now to the drawings, there is shown in FIGS. 1 and 2 an apparatus 10 for manufacturing an asphalt-based roofing material according to the invention. The illustrated manufacturing process involves passing a continuous sheet 12 in a machine direction (indicated by the arrows) through a series of manufacturing operations. The sheet usually moves at a speed of at least about 200 feet/minute (61 meters/minute), and typically at a speed within the range of between about 450 feet/minute (137 meters/minute) and about 800 feet/minute (244 meters/minute).

In a first step of the manufacturing process, a continuous sheet of substrate or shingle mat 12 is payed out from a roll 14. The substrate can be any type known for use in reinforcing asphalt-based roofing materials, such as a nonwoven web of glass fibers. The shingle mat 12 is fed through a coater 16 where an asphalt coating is applied to the sheet. The asphalt coating can be applied in any suitable manner. In the illustrated embodiment, the sheet is submerged in a supply of hot, melted asphalt coating to completely cover the sheet with the tacky coating. However, in other embodiments, the asphalt coating could be sprayed on, rolled on, or applied to the sheet by other means. Typically the asphalt material is highly filled with a ground stone filler material, amounting to at least about 60 percent by weight of the asphalt/filler combination.

The resulting asphalt-coated sheet 18 is then passed beneath a series of granule dispensers 20 for the application of granules to the upper surface of the asphalt coated sheet. The granule dispensers can be of any type suitable for depositing granules onto the granule covered sheet. A preferred granule dispenser is a granule blender of the type disclosed in U.S. Pat. No. 5,599,581 to Burton et al., which is hereby incorporated by reference, in its entirety. Any suitable configuration of granule dispensers can be used. For example, granule blenders 24 and 36 can be used to is deposit background granules 38 on the tab portion 22 of the asphalt coated sheet 18, and granule blenders 30 and 34 can be used to apply first and second accent colors, 28, 32 respectively. A preferred technique for assuring a generally sharp demarcation between zones of different colors is disclosed in U.S. Pat. No. 5,405,647 to Grubka et al., which is hereby incorporated by reference in its entirety.

After all the granules are deposited on the sheet, the granule covered sheet 40 is turned around a slate drum 44 to press the granules into the asphalt coating and to temporarily invert the sheet so that the excess granules will fall off and will be recovered and reused. The granule covered sheet 40 is subsequently fed through a rotary pattern cutter 52 which includes a bladed cutting cylinder 54, backup roll 56 and a motor 58, as shown in FIGS. 1 and 2. The pattern cutter 52 cuts a series of cutouts 60 in the tab portion 22 of the granule covered sheet 40, and also cuts a series of notches 62 in the underlay portion 48 of the granule covered sheet. It can be seen that the cutouts 60 divide the various color blend drops 28, 32, 38 into tabs 64, with each tab being one of the three colors of the blend drops, i.e., the background color, the first accent color or the second accent color.

The pattern cutter 52 also cuts the granule covered sheet 40 into the continuous underlay sheet 66 and the continuous overlay sheet 68, as shown in FIG. 2. The underlay sheet 66 is directed to be aligned beneath the overlay sheet 68, and the two sheets are laminated together to form a continuous laminated sheet 70. As shown in FIG. 1, the continuous underlay sheet 66 is routed on a longer path than the path of the continuous overlay sheet 68. Further downstream the continuous laminated sheet 70 is passed into contact with a rotary length cutter 72 that cuts the laminated sheet 70 into individual laminated, slate look, tab and cutout shingles 74. The length of the shingles 74 is preferably 40 inches, but any length could be used.

In order to facilitate synchronization of the cutting and laminating steps, various sensors and controls can be employed. A timing mark 80 indicating the period of the blend drops 28, 32, 38 can be applied to an appropriate part of the shingle, such as the headlap portion 46, to be used for synchronization. The timing mark can be applied by any means, and can be a thin blend drop of granules applied by the timing mark blender 82. The timing can be sensed by a sensor, such as a photoeye 84, for synchronization with the rotating rotary pattern cutter 52 so that the cutouts 60 and notches 62 will be situated at the intersections of adjacent blend drops. Sensors, such as photoeyes 86 and 88 can be used to synchronize the continuous underlay sheet 66 with the continuous overlay sheet 68. Sensors 90 can be used to synchronize the notches and cutouts of the continuous laminated sheet with the end cutter or length cutter 72.

Figure 3:
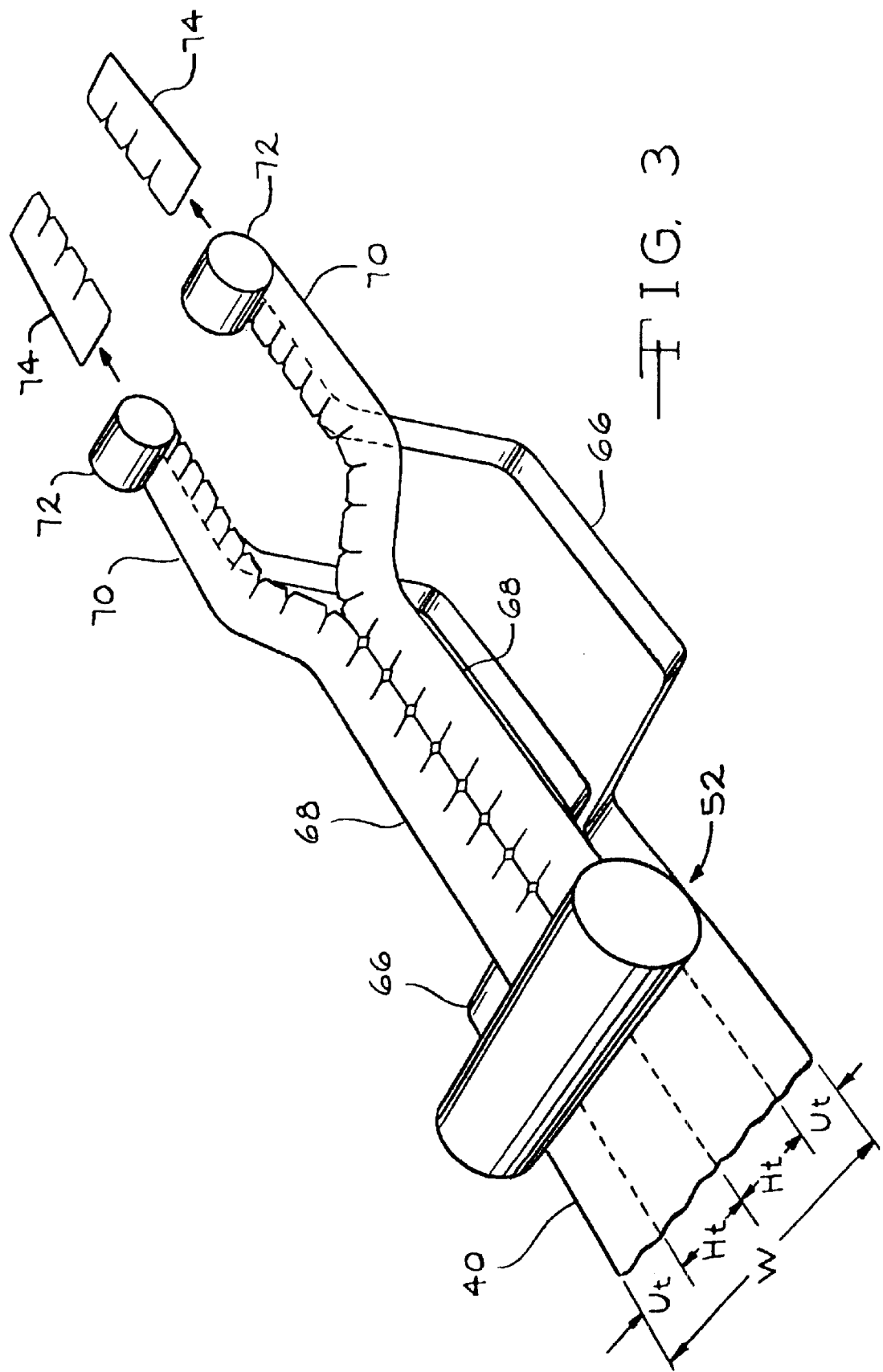
FIG. 3 is a schematic perspective view of the apparatus of FIG. 1 used to simultaneously make two slate look laminated shingles according to the method of the invention.

While FIG. 2 shows only a single shingle being made at one time, practice of the invention involves simultaneously making at least two shingles simultaneously. As shown in FIG. 3, the granule covered sheet 40 is based on the original shingle mat 12, which has a width W. The granule covered sheet 40 is continuously divided by the pattern cutter 52 into the two continuous overlay sheets 68. For purposes of this patent application these can be referred to as the second overlay sheets. The granule covered sheet 40 is also divided into two continuous underlay sheets 66, which can be referred to as the second underlay sheets for purposes of this patent application. When these sheets 66, 68 are laminated together and laid on the roof, their height, measured up and down the slope of the roof, can be considered to be as shown in FIG. 3, with the height of the two second overlay sheets indicated at Ht and the height of the two second underlay sheets at Ut. As shown in FIGS. 5 and 6, the shingle 74 formed by the process in FIG. 3 includes the shingle overlay 110 and underlay 112. The heights Ht and Ut of the overlays and underlays respectively are shown. A highly preferred width and spacing of the tabs and cutouts is about 9 inches and about 1 inch, respectively. Other spacing is possible. Preferably, the width of the tabs is within range of from about 5 to about 12 inches, and the width of the cutouts is within the range of from about ½ to about 3 inches. It can be seen that the sum of the height of each of the two continuous second underlay sheets plus the height of the headlap portion and tab portion of each of the two second overlay sheets substantially equals the width W of the shingle mat 12. In equation form, 2 Ut plus 2 Ht equals W.

Figure 4:
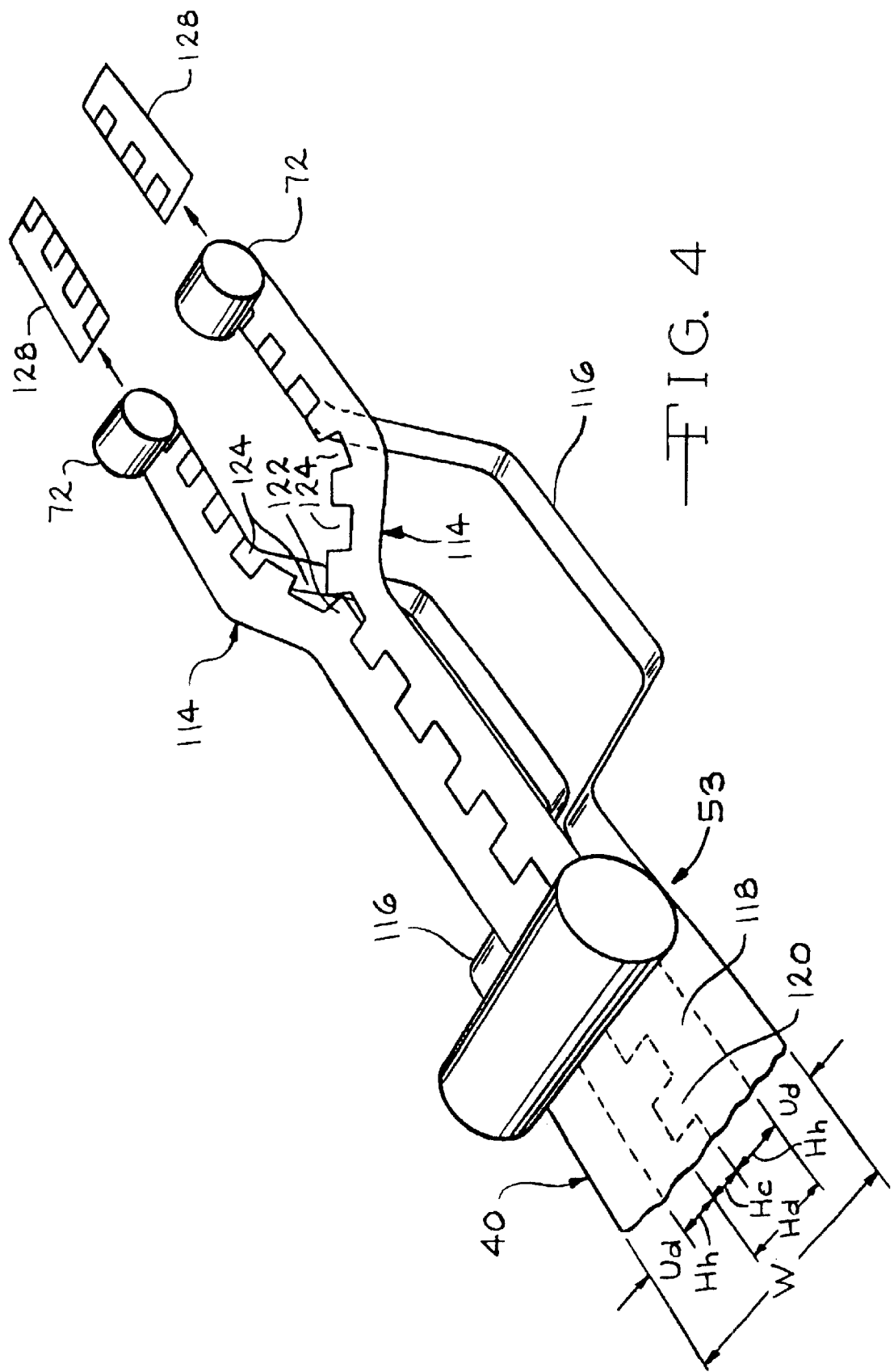
FIG. 4 is a schematic perspective view of the apparatus of FIG. 1 used to simultaneously make two wide tab and wide cutout laminated shingles according to the method of the invention.

In contrast to the slate look shingles 74 shown in FIGS. 5 and 6, and shown being manufactured in FIG. 3, the wide tab and wide cutout laminated shingles shown being made in FIG. 4 have tabs and cutouts that are substantially equal in area. It is to be understood that the widths of the tabs can vary, and need not be uniform. As shown in FIG. 4, the granule covered sheet 40 is continuously divided by a different pattern cutter 53 into the two continuous first overlay sheets 114 and two continuous first underlay sheets 116. The two first continuous overlay sheets 114 each have a headlap portion 118 (shown most clearly in FIGS. 7 and 8) and the two first continuous overlay sheets share a common tab portion 120 having tabs 122 and cutouts 124 that are complementary so that the cutouts and tabs of one of the first overlay sheets are in registration with the tabs and cutouts, respectively, of the other one of the first overlay sheets. After the first continuous overlay sheets and first continuous underlay sheets 116 are laminated together to form a continuous laminated sheet 126, individual shingles 128 are cut by the length cuter 72. The length of the shingles 74 is preferably 40 inches, but any length could be used. The individual shingles, as shown in FIGS. 7 and 8, are comprised of the overlay 130 and the underlay 132. When these shingles 128 are laid on the roof, their height measured up and down the slope of the roof can be considered to be as shown in FIG. 4, with the height of the two first underlay sheets 116 indicated at Ud in FIGS. 4 and 7, with the height of the two headlap portions 118 of the two first overlay lay sheets indicated at Hh in FIGS. 4 and 8, and with the height of the common tab portion 120 indicated at Hc in FIGS. 4, 7 and 8. It can be seen that the sum of the height of each of the two continuous first underlay sheets 116 plus the height of each of the headlap portions 118 of the two first overlay sheets plus the height of the common tab portion 120 substantially equals the width W of the shingle mat 12. In equation form:

$$2\ Ud + 2\ Hh + Hc \cong W.$$

It can be seen that the method the invention enables the use of two shingle manufacturing processes to make two kinds of shingles. The first process makes tab and cutout slate look shingles 74, and the second process makes wide tab, wide cutout shingles 128, with both types of shingles capable of being made on the same shingle machine using a common shingle mat width. The only change necessary to switch from the first process to the second process is to change the pattern cutter from pattern cutter 52 to pattern cutter 53, or vice versa.

In a preferred embodiment of the invention, in the first process there is a relationship between the height of the laminated shingles, the width W of the shingle mat, and the height of the headlap portion and the common tab portion of the first overlay sheets. This relationship is as follows: the width W of the shingle mat minus ¾ inch substantially equals 2.5 times the sum of the height of the headlap portion and the common tab portion of one of the first overlay sheets. In equation form:

$$W - ¾\ \text{inch} \cong 2.5(Hh + Hc)$$

In another preferred embodiment of the invention, in the first process the following relationship also is achieved: three times the height of the common tab portion of one of the first overlay sheets substantially equals 1 inch plus 2.5 times the sum of the height of the headlap portion and the common tab portion of one of the first overlay sheets. In equation form:

$$3Hc \cong 1\ \text{inch} + 2.5(Hh + Hc)$$

In yet another preferred embodiment of the invention, in the first processes the following relationship also is achieved: the height of the laminated shingles made from the first process is established so that it substantially equals 1.2 times the height of one of the second overlay sheets (from the second process) minus 0.4 inches. In equation form:

$$Hh + Hc \cong 1.2\ Ht - 0.4$$

Because the height of the shingle equals the height of the headlap portion plus the height of the tab portion (Hd=Hh+Hc), this can also be written as $$Hd \cong 1.2\ Ht - 0.4$$

In a different preferred embodiment of the invention, in the second process the following relationship also is achieved: the height of the laminated shingles made from the second process is established so that the width W of the shingle mat plus ¼ inch equals three times the height of the laminated shingles. In equation form:

$$W + ¼\ \text{inch} \cong 3\ Ht$$

In a specific example of the invention, the continuously supplied shingle mat has a width of about 51 inches, and the first granule covered sheet is continuously divided into two continuous first underlay sheets having a height of about 10 inches, and two continuous first overlay sheets each having a headlap portion with a height of about 11 inches and a shared a common tab portion having a height of about 9 inches, thereby ultimately forming laminated shingles having a height of about 20 inches; in the second process, the second granule covered sheet is continuously divided into two continuous second overlay sheets having a height of about 17 inches and two continuous second underlay sheets having a height of about 8½ inches, thereby ultimately forming laminated shingles having a height of about 17 inches. The shingle machine is switched one process to the other process to make shingles of two different dimensions with a common shingle mat having a width W of about 51 inches.

It is to be understood that the invention can be practiced by scaling up the two-wide shingle apparatus shown in the drawings to a four-wide shingle apparatus, not shown. In such a case the invention would involve making four shingles simultaneously rather than two shingles at the same time.

The principle and mode of operation of this invention have been described in its preferred embodiments. However, it should be noted that this invention may be practiced otherwise than as specifically illustrated and described without departing from its scope.

What is claimed is:

1. A method of manufacturing laminated roofing shingles on a single shingle machine comprising coating a continuously supplied shingle mat having a width W with roofing asphalt to make an asphalt coated sheet, and subjecting the asphalt coated sheet to one of two subsequent processes;

wherein the first process comprises:

covering the asphalt coated sheet with granules in a first pattern suitable for making laminated shingles with an overlay having tabs and cutouts, where the area of the tabs approximately equals the area of the cutouts, thereby forming a first granule covered sheet;

continuously dividing the first granule covered sheet into two continuous first overlay sheets and two continuous first underlay sheets, wherein the two first overlay sheets each have a headlap portion and the two first overlay sheets share a common tab portion having tabs and cutouts that are complementary so that the cutouts and tabs of one of the first overlay sheets are in registration with the tabs and cutouts, respectively, of the other one of the first overlay sheets, and wherein the sum of the height of each of the two continuous first underlay sheets plus the height of each of the headlap portions of the two first overlay sheets plus the height of the common tab portion substantially equals the width W of the shingle mat;

laminating each one of the first underlay sheets beneath a respective one of the first overlay sheets to form laminated sheets; and cutting the laminated sheets into laminated shingles; and wherein the second process comprises:

covering the asphalt coated sheet with granules in a second pattern suitable for making laminated shingles with an overlay having tabs and cutouts, where the area of the tabs is substantially greater than the area of the cutouts, thereby forming a second granule covered sheet;

continuously dividing the second granule covered sheet into two continuous second underlay sheets and into two continuous second overlay sheets, wherein the two second overlay sheets each have a headlap portion and a tab portion, and wherein the sum of the height of each of the two continuous second underlay sheets plus the height of the headlap portion and tab portion of each of the two second overlay sheets substantially equals the width W of the shingle mat; and laminating each one of the second underlay sheets beneath a respective one of the second overlay sheets to form laminated sheets; and cutting the laminated sheets into laminated shingles; and switching from one of the first and second processes to the other process to make shingles on the single shingle machine according to either the first pattern or the second pattern using a common shingle mat having the width W.

2. The method of claim 1 wherein the height of the laminated shingles made from the first process is established so that the width W of the shingle mat minus ¾ inch substantially equals 2.5 times the sum of the height of the headlap portion and the common tab portion of one of the first overlay sheets.

3. The method of claim 1 wherein the height of the laminated shingles made from the first process is established so that the three times the height of the common tab portion of one of the first overlay sheets substantially equals 1 inch plus 2.5 times the sum of the height of the headlap portion and the common tab portion of one of the first overlay sheets.

4. The method of claim 1 wherein the height of the laminated shingles made from the first process is established so that it substantially equals 1.2 times the height of one of the second overlay sheets minus 0.4 inches.

5. The method of claim 1 wherein the height of the laminated shingles made from the second process is established so that the width W of the shingle mat plus ¼ inch substantially equals three times the height of the laminated shingles.

6. A method of manufacturing roofing shingles on a single shingle machine comprising coating a continuously supplied shingle mat, having a width of about 51 inches, with roofing asphalt to make an asphalt coated sheet, and subjecting the asphalt coated sheet to one of two subsequent processes;

wherein the first process comprises:

covering the asphalt coated sheet with granules in a pattern suitable for making laminated shingles having a height of about 20 inches, thereby forming a first granule covered sheet;

continuously dividing the first granule covered sheet into two continuous first overlay sheets and two continuous first underlay sheets, the two continuous first overlay sheets each having a headlap portion with a height of about 11 inches and a shared common tab portion having tabs and cutouts that are complementary so that the cutouts and tabs of one of the first overlay sheets are in registration with the tabs and cutouts, respectively, of the other one of the first overlay sheets, where the height of the common tab portion is about 9 inches, and where the two continuous first underlay sheets have a height of about 10 inches;

laminating each one of the first underlay sheets beneath a respective one of the first overlay sheets to form laminated sheets; and cutting the laminated sheets to form laminated shingles having a height of about 20 inches; and wherein the second process comprises:

covering the asphalt coated sheet with granules in a pattern suitable for making laminated shingles having a height of about 17 inches, thereby forming a second granule covered sheet;

continuously dividing the second granule covered sheet into two continuous second overlay sheets having a height of about 17 inches and two continuous second underlay sheets having a height of about 8 ½ inches;

laminating each one of the second underlay sheets beneath a respective one of the second overlay sheets to form laminated sheets; and cutting the laminated sheets to form laminated shingles having a height of about 17 inches; and switching from one of the first and second processes to the other process to make shingles of two different dimensions with a common shingle mat having a width W of about 51 inches on the single shingle machine.

* * * * *